(12) United States Patent
Gong et al.

(10) Patent No.: US 11,903,054 B2
(45) Date of Patent: Feb. 13, 2024

(54) METHOD FOR ESTABLISHING COMMUNICATION CONNECTION AND RELATED PRODUCTS

(71) Applicant: GUANGDONG OPPO MOBILE TELECOMMUNICATIONS CORP., LTD., Guangdong (CN)

(72) Inventors: Jinhua Gong, Guangdong (CN); Baoti Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 566 days.

(21) Appl. No.: 17/137,800

(22) Filed: Dec. 30, 2020

(65) Prior Publication Data

US 2021/0120607 A1   Apr. 22, 2021

Related U.S. Application Data

(63) Continuation of application No. PCT/CN2019/090955, filed on Jun. 12, 2019.

(30) Foreign Application Priority Data

Jul. 2, 2018   (CN) .......................... 201810707743.0

(51) Int. Cl.
*H04W 4/00*       (2018.01)
*H04W 76/14*      (2018.01)
(Continued)

(52) U.S. Cl.
CPC .......... *H04W 76/14* (2018.02); *H04B 17/318* (2015.01); *H04R 1/10* (2013.01);
(Continued)

(58) Field of Classification Search
CPC ........ H04W 4/80; H04R 1/10; H04R 2420/07
See application file for complete search history.

(56) References Cited

U.S. PATENT DOCUMENTS

| 9,877,098 | B1 * | 1/2018 | Riley ..................... H04R 5/033 |
| 10,159,105 | B1 * | 12/2018 | Linsky ..................... H04L 69/24 |
| 2012/0027215 | A1 * | 2/2012 | Sim ..................... H04R 1/1041 |
| | | | 381/55 |

(Continued)

FOREIGN PATENT DOCUMENTS

| CN | 104185122 | 12/2014 |
| CN | 206350153 | 7/2017 |

(Continued)

OTHER PUBLICATIONS

EPO, Partial Supplementary European Search Report for EP Application No. 19829744.2, dated Aug. 19, 2021.
(Continued)

*Primary Examiner* — Chi H Pham
*Assistant Examiner* — Elisabeth Benoit Magloire
(74) *Attorney, Agent, or Firm* — Hodgson Russ LLP

(57) ABSTRACT

A method for establishing a communication connection and related apparatuses are provided. The method is applicable to a first earphone of wireless earphones. The wireless earphones further include a second earphone. The first earphone is in communication connection with the terminal. The first earphone is in communication connection with the second earphone. The method includes the following. A first distance between the first earphone and the terminal is determined. A second distance between the second earphone and the terminal is determined. A first message is sent to the second earphone for instructing the second earphone to establish a communication connection with the terminal, when the first distance is greater than or equal to a first threshold value and the second distance is less than a second threshold value.

18 Claims, 4 Drawing Sheets

(51) Int. Cl.
*H04B 17/318* (2015.01)
*H04W 4/80* (2018.01)
*H04R 1/10* (2006.01)

(52) U.S. Cl.
CPC ........... *H04W 4/80* (2018.02); *H04R 2201/10* (2013.01); *H04R 2420/07* (2013.01)

(56) References Cited

U.S. PATENT DOCUMENTS

| | | | |
|---|---|---|---|
| 2013/0236027 A1* | 9/2013 | Tao ................... | H04R 3/00 381/74 |
| 2013/0243219 A1* | 9/2013 | Zeng .................. | H04L 1/1887 381/77 |
| 2014/0172421 A1* | 6/2014 | Liu ..................... | H04R 1/1083 381/94.1 |
| 2017/0023971 A1* | 1/2017 | Lee .................... | G02C 5/20 |
| 2017/0164214 A1* | 6/2017 | Hara .................. | H04L 67/06 |
| 2017/0214994 A1* | 7/2017 | Gadonniex .......... | H04R 1/105 |
| 2017/0223218 A1* | 8/2017 | Su ...................... | H04N 1/00506 |
| 2018/0035260 A1* | 2/2018 | Naudgauda .......... | H04W 4/027 |
| 2018/0091887 A1* | 3/2018 | Minoo ................. | H04R 1/1025 |
| 2018/0295564 A1* | 10/2018 | Madan ............... | H04L 63/0861 |

FOREIGN PATENT DOCUMENTS

| | | |
|---|---|---|
| CN | 106998511 | 8/2017 |
| CN | 107145330 | 9/2017 |
| CN | 107205192 | 9/2017 |
| CN | 107708014 | 2/2018 |
| CN | 107819922 | 3/2018 |
| CN | 107885478 | 4/2018 |
| WO | 2018026201 | 2/2018 |

OTHER PUBLICATIONS

EPO, Extended European Search Report for EP Application No. 19829744.2, dated Nov. 29, 2021.
WIPO, ISR and WO for PCT/CN2019/090955, Sep. 3, 2019.
SIPO, First Office Action for CN Application No. 201810707743.0, dated Dec. 24, 2019.
SIPO, Second Office Action for CN Application No. 201810707743. 0, dated Apr. 15, 2020.
CNIPA, Decision of Rejection for CN Application No. 201810707743. 0, dated Aug. 19, 2020.

* cited by examiner

METHOD FOR ESTABLISHING COMMUNICATION CONNECTION AND RELATED PRODUCTS

CROSS-REFERENCE TO RELATED APPLICATIONS

This application is a continuation of International Application No. PCT/CN2019/090955, filed on Jun. 12, 2019, which claims priority to Chinese Patent Application No. 201810707743.0, filed on Jul. 2, 2018, the entire disclosures of which are incorporated herein by reference.

TECHNICAL FIELD

This disclosure relates to the field of electronic technology, and more particularly to a method for establishing a communication connection and related apparatuses.

BACKGROUND

With wide spread of wireless technology, wireless connection can be supported by an increasing number of wireless devices. In practice, there may be a need to switch from communication connection with wireless device A to communication connection with wireless device B sometimes. Currently, such a switching process usually involves a series of manual operations of a user, for example, a previous communication connection is first disconnected and then a new communication connection is manually established, which results in a complicated switching process.

SUMMARY

Implementations provide a method for establishing a communication connection and related products.

In a first aspect, a method for establishing a communication connection is provided. The method is applicable to a first earphone of wireless earphones. The wireless earphones further include a second earphone. The first earphone is in communication connection with the terminal. The first earphone is in communication connection with the second earphone. The method includes the following. A first distance between the first earphone and the terminal is determined. A second distance between the second earphone and the terminal is determined. A first message is sent to the second earphone for instructing the second earphone to establish a communication connection with the terminal, when the first distance is greater than or equal to a first threshold value and the second distance is less than a second threshold value.

In a second aspect, an audio-output apparatus is provided. The terminal includes a processor, a memory, a communication interface, and one or more programs stored in the memory and executed by the processor. The one or more programs include instructions for performing the method described in the first aspect.

In a third aspect, a non-transitory computer-readable storage medium is provided. The computer-readable storage medium is configured to store computer programs for electronic data interchange (EDI) which, when executed, are operable with a computer to perform some or all operations of the method described in the first aspect.

These and other aspects of the disclosure will be more concise and easier to understand in the description of the following implementations.

BRIEF DESCRIPTION OF THE DRAWINGS

In order to describe technical solutions of implementations more clearly, the following will give a brief description of accompanying drawings used for describing the implementations. Apparently, accompanying drawings described below are merely some implementations. Those of ordinary skill in the art can also obtain other accompanying drawings based on the accompanying drawings described below without creative efforts.

DETAILED DESCRIPTION

In order for those skilled in the art to better understand technical solutions of implementations, technical solutions of implementations will be described clearly and completely with reference to accompanying drawings in the implementations. Apparently, implementations hereinafter described are merely some implementations, rather than all implementations, of the disclosure. All other implementations obtained by those of ordinary skill in the art based on the implementations herein without creative efforts shall fall within the protection scope of the disclosure.

Detailed description will be given below.

The terms "first", "second", "third", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

Figure 1:
FIG. 1 is a schematic structural diagram of a system for establishing a communication connection according to implementations.

FIG. 1 is a schematic structural diagram of a system for establishing a communication connection according to implementations. The system includes a terminal and wireless earphones. The wireless earphones include a first earphone and a second earphone. At least one of the wireless earphones is in communication connection with the terminal through wireless technology such as Bluetooth, infrared, etc.

The terminal may include various handheld devices, in-vehicle devices, wearable devices, computing devices that have wireless communication functions or other processing devices connected to a wireless modem, as well as various forms of user equipments (UE), mobile stations (MS), terminal devices, and the like.

An operating principle of the system for establishing a communication connection is as follows. The terminal is connected with the first earphone, and the first earphone is connected with the second earphone. The first earphone determines a first distance between the terminal and the first earphone and a second distance between the terminal and the second earphone. When the first distance is greater than or equal to a first threshold value and the second distance is less than a second threshold value, the first earphone notifies the second earphone to establish a communication connection with the terminal, which does not require manual operations of a user, thereby improving communication connection efficiency.

Figure 2:
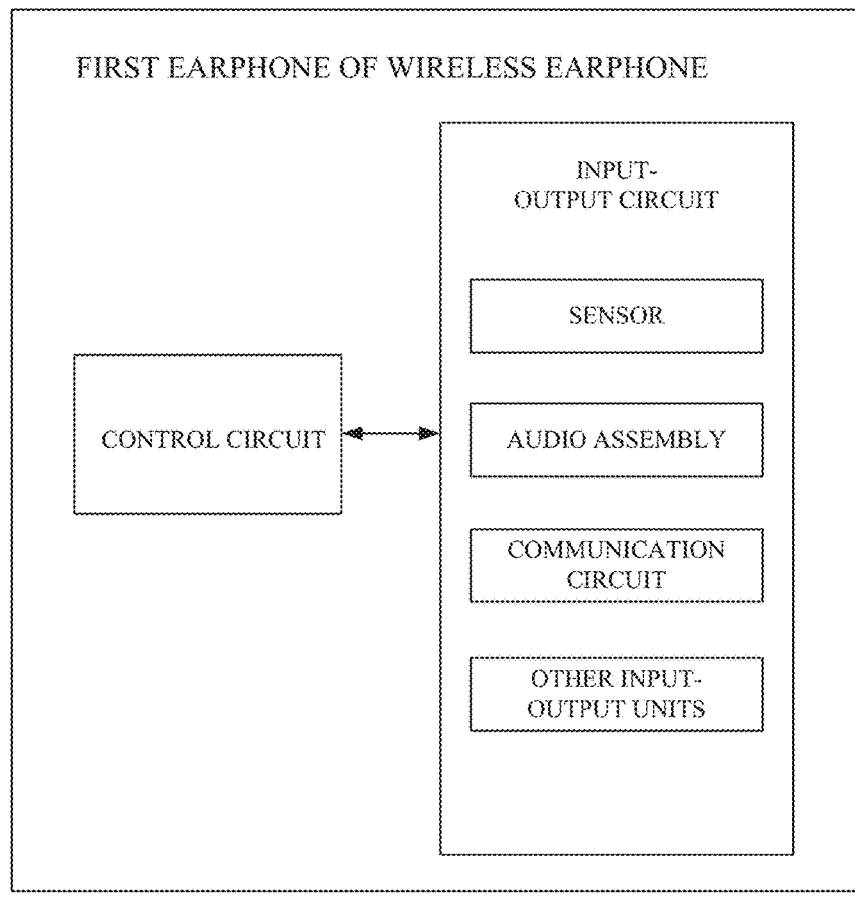
FIG. 2 is a schematic structural diagram of a first earphone of wireless earphones according to implementations.

FIG. 2 is a schematic structural diagram of a first earphone of wireless earphones according to implementations. The first earphone includes a control circuit and an input-output circuit. The input-output circuit is coupled with the control circuit.

The control circuit can include a store-and-process circuit. The store-and-process circuit has a storing circuit which may be a memory, such as a hard drive memory, a non-transitory memory (such as a flash memory, other electronically programmable read-only memories used to form a solid-state drive, or the like), a transitory memory (such as a static random access memory, a dynamic random access memory, or the like), or the like, and the disclosure is not limited in this regard. The store-and-process circuit has a processing circuit to control operations of the first earphone. The processing circuit can be implemented based on one or more microprocessors, microcontrollers, digital signal processors, baseband processors, power management units, audio codec chips, application-specific integrated circuits, display driver integrated circuits, or the like.

The store-and-process circuit can be configured to run software of the first earphone, for example, a communication processing application, a data transmission application, a distance determining application, a received signal strength indicator (RSSI) value determining application, an audio output application, etc. These applications can be used to perform some control operations such as establishing a communication connection, disconnecting communication connection, determining a distance between the first earphone and a second earphone of the wireless earphones, determining a distance between the first earphone and terminal, determining a distance between the first earphone and second earphone, determining an RSSI value of a signal between the first earphone and the terminal, determining an RSSI value of a signal between the first earphone and the second earphone, determining an RSSI value of a signal between the second earphone and the terminal, outputting audio, and other functions of the first earphone, which is not limited herein.

The input-output circuit can be configured to achieve data input and data output of the first earphone, that is, to allow the first earphone to receive data from an external device and also allow the first earphone to output data to an external device.

The input-output circuit can further include a sensor. The sensor can include a gesture sensor, a pressure sensor, an acceleration sensor, an infrared proximity sensor, a capacitance sensor, a heart rate sensor, a body temperature sensor, a tap-signal acquisition apparatus, and other sensors. The tap-signal acquisition apparatus includes at least one of the following: a capacitance sensor, a pressure sensor, a camera, and so on.

The input-output circuit can further include an audio assembly. The audio assembly is configured to provide the first earphone with audio input and output functions. The audio assembly of the first earphone may include loudspeakers, microphones, buzzers, tone generators, and other assemblies for generating and detecting sound.

The input-output circuit can further include a communication circuit. The communication circuit is configured to provide the first earphone with the ability to communicate with external devices. For instance, the communication circuit includes analog/digital input-output interface circuits and wireless communication circuits based on radio frequency signals and/or optical signals. The wireless communication circuit of the input-output circuit may include a radio frequency transceiver circuit, a power amplifier circuit, a low-noise amplifier, a switch, a filter, and an antenna. As an example, the wireless communication circuit of the input-output circuit includes a circuit for supporting near field communication (NFC) by transmitting and receiving near field coupled electromagnetic signals. The input-output circuit may include an NFC antenna and an NFC transceiver.

The input-output circuit can further include other input-output units. The other input-output units may include buttons, joysticks, click wheels, scroll wheels, touch pads, keypads, keyboards, cameras, LEDs, and other status indicators.

The first earphone may further include a battery (not illustrated in FIG. 2) for powering the first earphone.

Figure 3:
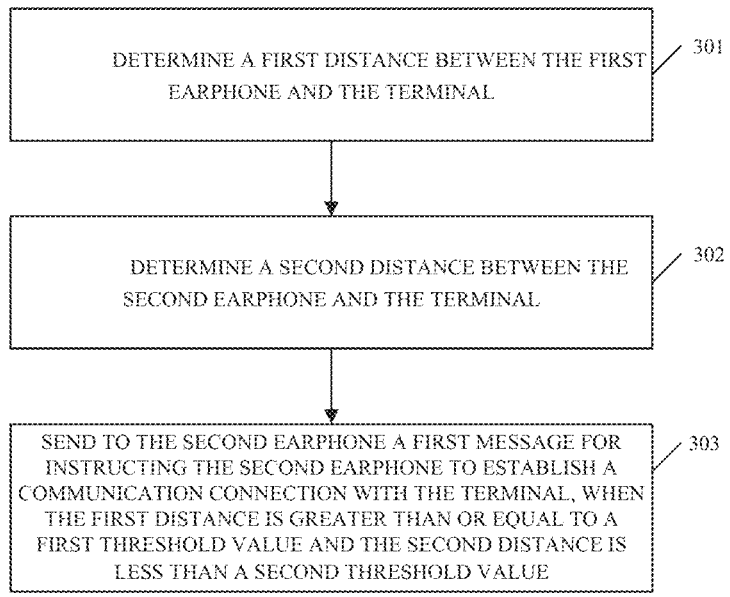
FIG. 3 is a schematic flowchart of a method for establishing a communication connection according to implementations.

FIG. 3 is a schematic flowchart of a method for establishing a communication connection according to implementations. The method is applicable to a first earphone of wireless earphones. The wireless earphones further include a second earphone. The first earphone is in communication connection with the terminal, and the first earphone is in communication connection with the second earphone. The method includes the following.

At block 301, the first earphone determines a first distance between the first earphone and the terminal.

At block 302, the first earphone determines a second distance between the second earphone and the terminal.

In some implementations, the first earphone determines the first distance between the first earphone and the terminal and the second distance between the second earphone and the terminal as follows. The first earphone determines a first position of the first earphone, and acquire a second position of the second earphone and a third position of the terminal. The first earphone determines the first distance according to the first position and the third position, and the second earphone determines the second distance according to the second position and the third position.

In some examples, the first earphone can determine, on its own, a position of the first earphone directly through wireless-fidelity (WiFi) positioning technology, but is unable to determine, on its own, a position of the second earphone and a position of the terminal through WiFi positioning technology.

The first earphone can acquire the third position of the terminal as follows.

In some examples, the terminal determines the third position of the terminal through WiFi positioning technology, the terminal reports periodically to the first earphone the third position of the terminal, and the first earphone receives the third position of the terminal. In other examples, the first earphone sends a request for position acquisition to the terminal. The terminal, upon receiving the request for position acquisition, determines the third position of the terminal through WiFi positioning technology, and reports to the first earphone the third position of the terminal in response to the request for position acquisition. The first earphone receives the third position of terminal.

The first earphone can acquire the second position of the second earphone as follows.

In some examples, the second earphone determines the second position of the second earphone through WiFi positioning technology, the second earphone reports periodically to the first earphone the second position of the second earphone, and the first earphone receives the second position of the second earphone. In other examples, the first earphone sends a request for position acquisition to the second earphone. The second earphone, upon receiving the request for position acquisition, determines the second position of the second earphone through WiFi positioning technology, and reports to the first earphone the second position of the second earphone in response to the request for position acquisition. The first earphone receives the second position of second earphone.

It should be noted that, according to implementations herein, the first earphone can first determine the second position and then determine the first position and the third position, which is not limited herein. While performing WiFi positioning technology, the terminal, the first earphone, and the second earphone share one wireless access point. The position of the terminal, the position of the first earphone, and the position of the second earphone each are expressed by coordinates. A distance between two points can be determined as long as a position of each of the two points is known, which belongs to the related art and thus will not be elaborated herein.

In some implementations, the first earphone determines the first distance between the first earphone and the terminal and the second distance between the second earphone and the terminal as follows.

The first earphone determines a first RSSI value of a signal between the first earphone and the terminal, and determines the first distance according to the first RSSI value. The first earphone acquires a second RSSI value of a signal between the second earphone and the terminal, and determines the second distance according to the second RSSI value.

Since the first earphone is connected with the terminal, the first earphone can determine directly the first RSSI value of a signal between the first earphone and the terminal. However, the first earphone is unable to determine directly the second RSSI value of a signal between the second earphone and the terminal.

The first earphone can determine the second RSSI value of a signal between the second earphone and the terminal as follows. The terminal sends periodically a Bluetooth low energy (BLE) broadcast to the second earphone by means of BLE broadcast. The second earphone, upon receiving the BLE broadcast from the terminal, can acquire the second RSSI value of a signal between the second earphone and the terminal. The second earphone reports to the first earphone the determined second RSSI value and the first earphone receives the second RSSI value.

The first earphone can determine a distance according to an RSSI value as follows. The first earphone determines, according to a mapping relationship between distances and RSSI values, a distance corresponding to the RSSI value. In the mapping relationship between distances and RSSI values, the RSSI value is inversely proportional to the distance, that is, a high RSSI value corresponds to a short distance, and a low RSSI value corresponds to a long distance.

It should be noted that, according to implementations herein, the first earphone may first determine the first distance and then determine the second distance, or first determine the second distance and then determine the first distance, and the disclosure is not limited in this regard.

At block 303, the first earphone sends to the second earphone a first message for instructing the second earphone to establish a communication connection with the terminal, when the first distance is greater than or equal to a first threshold value and the second distance is less than a second threshold value.

The first threshold value and the second threshold value can be set by a user or the terminal, which is not limited herein. The second threshold value may be equal to, less than, or greater than the first threshold, and the disclosure is not limited in this regard.

In some implementations, the first distance is greater than the second distance.

In some implementations, the second earphone establishes a communication connection with the terminal upon receiving the first message.

In some examples, the second earphone establishes the communication connection between the second earphone and the terminal as follows. The second earphone sends a request for establishing a communication connection at a predetermined frequency band. The second earphone receives a first response, where the first response is sent by the terminal at the predetermined frequency band in response to the request for establishing a communication connection and the first response carries frequency-hopping sequence information and clock phase information of the terminal. The second earphone adjusts a frequency band of the second earphone according to the frequency-hopping sequence information, and adjusts a time-frequency location of the second earphone according to the clock phase information. The second earphone sends a second response to the terminal at the predetermined frequency band, thus completing establishing the communication connection.

The predetermined frequency band may be a current frequency band of the second earphone, or a frequency band that can be monitored by the second earphone, or an agreed frequency band between the second earphone and the terminal, which is not limited herein.

The frequency-hopping sequence information refers to a code sequence for controlling hopping of a carrier frequency. The frequency-hopping sequence information is mainly used to control frequency hopping of a carrier within a frequency band. When frequency hopping is performed within one frequency band, the frequency hopping sequence information is the only indicator for distinguishing users. The clock phase information is mainly indicative of a start time and an end time of sending data and a start time and an end time of reading data.

According to implementations herein, the terminal is connected with the first earphone, and the first earphone is connected with the second earphone. The first earphone determines the first distance between the terminal and the first earphone and the second distance between the second earphone and the terminal. When the first distance is greater than or equal to the first threshold value and the second distance is less than or equal to the second threshold value, the first earphone notifies the second earphone to establish a communication connection with the terminal, which does not require manual operations of a user, thereby improving communication connection efficiency.

In some implementations, after the first earphone sends to the second earphone the first message, the method can further include that the first earphone disconnects the communication connection between the first earphone and the terminal.

The first earphone can disconnect the communication connection between the first earphone and the terminal as follows. The first earphone sends to the terminal a request for disconnecting communication connection. The first earphone receives a disconnection response in response to the request for disconnecting communication connection sent from the terminal and disconnects the communication connection between the first earphone and the terminal.

In some implementations, before sending to the second earphone the first message, the following can be performed. The first earphone determines that an RSSI value of a signal between the terminal and the first earphone is less than or equal to a third threshold value.

The third threshold value can be set by the user or the terminal, which is not limited herein.

A long distance between the first earphone and the terminal is not necessarily indicative of a low transmission efficiency between the terminal and the first earphone. Therefore, before a new communication connection is established, the first earphone determines whether it is necessary to establish the new communication connection, thereby improving accuracy in establishing a new communication connection.

Specifically, before the new communication connection between the terminal and second earphone is established, the first earphone determines whether the RSSI value of the signal between the terminal and the first earphone is less than or equal to the third threshold value so as to determine whether it is necessary to establish the new communication connection between the terminal and second earphone. When the RSSI value of the signal between the terminal and the first earphone is less than or equal to the third threshold value, the first earphone determines it is necessary for the second earphone to establish the new communication connection, thereby improving accuracy in establishing the new communication connection.

In some examples, the following can further be performed. The first earphone generates a first voice reminder for reminding a user to shorten a distance between the first earphone and the terminal, when the first distance is greater than the second distance, the first distance is greater than or equal to the first threshold value, the second distance is greater than or equal to the second threshold value, and there are data to be transmitted from the terminal to the first earphone.

Since the first earphone is in communication connection with the terminal and the terminal may send data to first earphone, when the first earphone has been receiving data sent by the terminal in a certain period of time, it can be inferred that there are data to be transmitted from the terminal to the first earphone.

In this way, when the distance between the terminal and each of the first earphone and the second earphone is long and the terminal has data that are to be transmitted to the first earphone, the first earphone generates a voice reminder, to remind the user of a long distance between the first earphone and the terminal and remind the user to shorten the distance between the first earphone and the terminal, which is possible to guarantee data transmission efficiency.

In some implementations, before generating the first voice reminder, the first earphone determines that the first earphone is in a wearing state.

The first earphone can include a heart rate sensor and a body temperature sensor. When each heart rate detected by the heart rate sensor within a first time period matches a heart rate of a human body, and/or each body temperature detected by the body temperature sensor within a second time period matches a body temperature of a human body, the first earphone determines that the first earphone is in the wearing state; otherwise, the first earphone determines that the first earphone is in a non-wearing state.

In some implementations, the method includes the following. The first earphone determines whether the second earphone is in the wearing state, when the first earphone is in the non-wearing state. The first earphone instructs the second earphone to generate a second voice reminder for reminding the user to shorten the distance between the first earphone and the terminal, when the second earphone is in the wearing state The first earphone can determine whether the second earphone is in the wearing state as follows. The first earphone sends to the second earphone a request for wearing-state acquisition. The second earphone, upon receiving the request for wearing-state acquisition, determines whether the second earphone is in the wearing state, and then sends to the first earphone a wearing/non-wearing state determined in response to the request for wearing-state acquisition. The first earphone receives from the second earphone the wearing/non-wearing state.

The second earphone can include a heart rate sensor and a body temperature sensor. When each heart rate detected by the heart rate sensor within a third time period matches a heart rate of a human body, and/or each body temperature detected by the body temperature sensor within a fourth time period matches a body temperature of a human body, the second earphone determines that the second earphone is in the wearing state; otherwise, the second earphone determines that the second earphone is in a non-wearing state.

Therefore, according to implementations herein, an earphone generates a voice reminder only when the earphone is in the wearing state, which improves efficiency in receiving the voice reminder.

Figure 4:
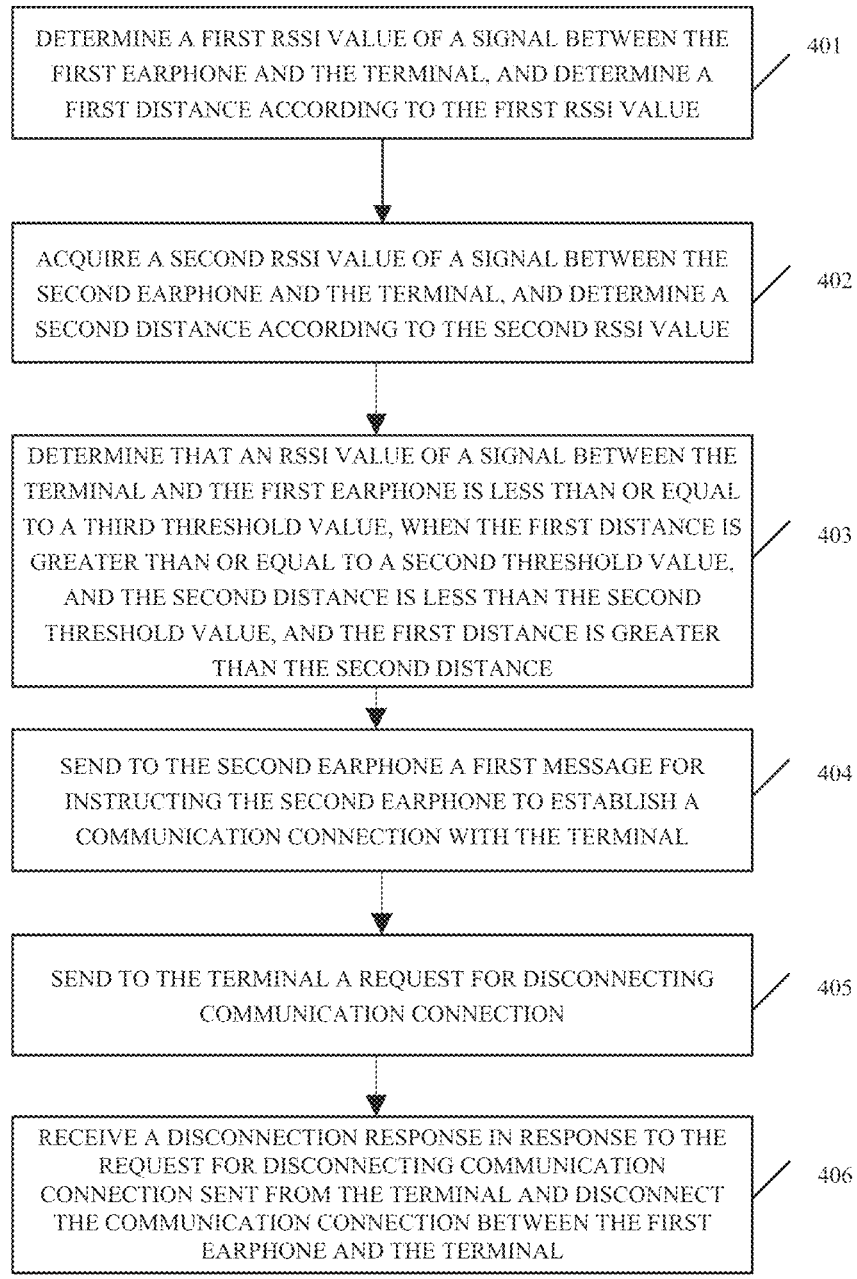
FIG. 4 is a schematic flowchart of a method for establishing a communication connection according to other implementations.

Implementations further provide a more detailed flowchart of a method for establishing a communication connection. As illustrated in FIG. 4, the method is applicable to a first earphone of wireless earphones. The wireless earphones further include a second earphone. The first earphone is in communication connection with the terminal, and the first earphone is in communication connection with the second earphone. The method includes the following.

At block 401, the first earphone determines a first RSSI value of a signal between the first earphone and the terminal, and determines a first distance according to the first RSSI value.

At block 402, the first earphone acquires a second RSSI value of a signal between the second earphone and the terminal, and determines a second distance according to the second RSSI value.

At block 403, the first earphone determines that an RSSI value of a signal between the terminal and the first earphone is less than or equal to a third threshold value, when the first distance is greater than or equal to a first threshold value, the second distance is less than a second threshold value, and the first distance is greater than the second distance.

At block 404, the first earphone sends to the second earphone a first message for instructing the second earphone to establish a communication connection with the terminal.

At block 405, the first earphone sends to the terminal a request for disconnecting communication connection.

At block 406, the first earphone receives a disconnection response and disconnects the communication connection between the first earphone and the terminal, where the disconnection response is sent from the terminal in response to the request for disconnecting communication connection.

It should be noted that, for details of the implementation process of each step of the method illustrated in FIG. 4, reference can be made to the foregoing implementations, which will not be repeated herein.

Figure 5:
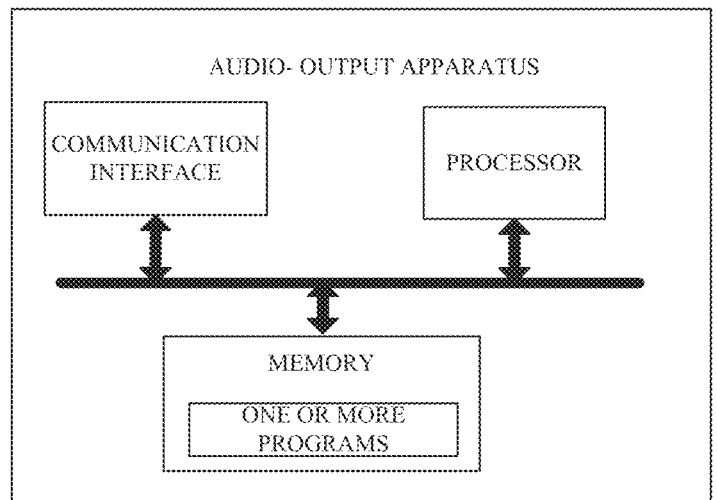
FIG. 5 is a schematic structural diagram of an audio-output apparatus according to implementations.

Similar to implementations illustrated in FIG. 3 and FIG. 4, FIG. 5 is a schematic structural diagram of an audio-output apparatus according to other implementations. The audio-output apparatus is applicable to a first earphone of wireless earphones. The wireless earphones further include a second earphone. The first earphone is in communication connection with the terminal, and the first earphone is in communication connection with the second earphone. As illustrated in FIG. 5, the first earphone includes a processor, a memory, a communication interface, and one or more programs stored in the memory and executed by the processor. The one or more programs include instructions for performing the following operations. A first distance between the first earphone and the terminal is determined. A second distance between the second earphone and the terminal is determined. A first message is sent to the second earphone for instructing the second earphone to establish a communication connection with the terminal, when the first distance is greater than or equal to a first threshold value and the second distance is less than a second threshold value.

According to implementations, the terminal is connected with the first earphone, and the first earphone is connected with the second earphone. The first earphone determines the first distance between the terminal and the first earphone and the second distance between the second earphone and the terminal. When the first distance is greater than or equal to the first threshold value and the second distance is less than the second threshold value, the first earphone notifies the second earphone to establish a communication connection with the terminal, which does not require manual operations of a user, thereby improving communication connection efficiency.

In some implementations, the first distance is greater than the second distance.

In some implementations, in terms of determining the first distance between the first earphone and the terminal and determining the second distance between the second earphone and the terminal, the one or more programs include instructions for performing the following operations. A first position of the first earphone is determined and a second position of the second earphone and a third position of the terminal are acquired. The first distance is determined according to the first position and the third position, and the second distance is determined according to the second position and the third position.

In some implementations, in terms of determining the first distance between the first earphone and the terminal and determining the second distance between the second earphone and the terminal, the one or more programs include instructions for performing the following operations. A first received signal strength indicator (RSSI) value of a signal between the first earphone and the terminal is determined, and the first distance is determined according to the first RSSI value. A second RSSI value of a signal between the second earphone and the terminal is acquired, and the second distance is determined according to the second RSSI value.

In some implementations, the one or more programs further include instructions for performing the following operations after sending to the second earphone the first message. A request for disconnecting communication connection is sent to the terminal. A disconnection response in response to the request for disconnecting communication connection sent from the terminal is received. The communication connection between the first earphone and the terminal is disconnected.

In some implementations, the one or more programs further include instructions for performing the following operations before sending to the second earphone the first message. An RSSI value of a signal between the terminal and the first earphone is determined to be less than or equal to a third threshold value.

In some implementations, the one or more programs further include instructions for performing the following operations. A first voice reminder for reminding a user to shorten a distance between the first earphone and the terminal is generated, when the first distance is greater than the second distance, the first distance is greater than or equal to the first threshold value, the second distance is greater than or equal to the second threshold value, and there are data to be transmitted from the terminal to the first earphone.

In some implementations, the one or more programs further include instructions for performing the following operations before generating the first voice reminder. The first earphone is in a wearing state is determined.

In some implementations, the one or more programs further include instructions for performing the following operations. Whether the second earphone is in the wearing state is determined when the first earphone is in a non-wearing state. The second earphone is instructed to generate a second voice reminder for reminding the user to shorten the distance between the first earphone and the terminal, when the second earphone is in the wearing state.

It should be noted that, for details of the implementation process, reference can be made to the foregoing implementations, which will not be repeated herein.

Figure 6:
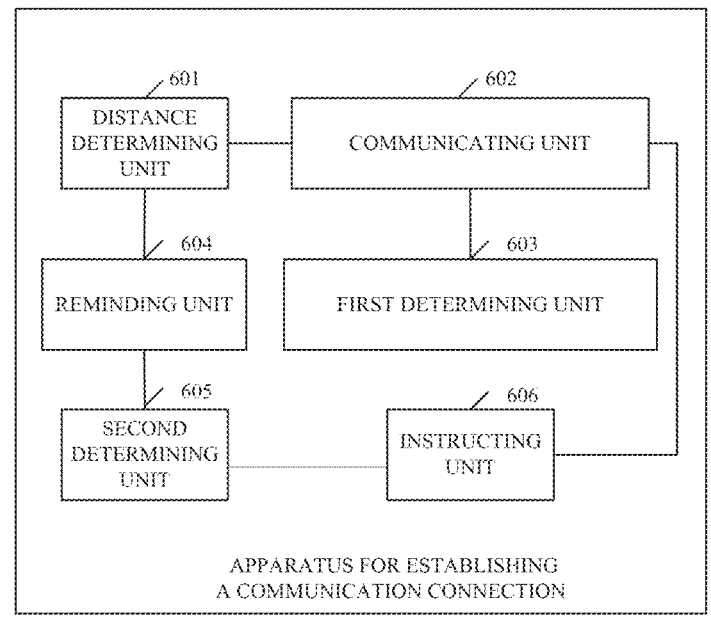
FIG. 6 is a schematic structural diagram of an apparatus for establishing a communication connection according to implementations.

FIG. 6 is a schematic structural diagram of an apparatus for establishing a communication connection according to implementations. The apparatus is applicable to a first earphone of wireless earphones. The wireless earphones further include a second earphone. The first earphone is in communication connection with the terminal, and the first earphone is in communication connection with the second earphone. The apparatus includes a distance determining unit 601 and a communicating unit 602.

The distance determining unit 601 is configured to determine a first distance between the first earphone and the terminal and determine a second distance between the second earphone and the terminal.

The communicating unit 602 configured to send to the second earphone a first message for instructing the second earphone to establish a communication connection with the terminal, when the first distance is greater than or equal to a first threshold value and the second distance is less than a second threshold value.

According to implementations, the terminal is connected with the first earphone, and the first earphone is connected with the second earphone. The first earphone determines the first distance between the terminal and the first earphone and the second distance between the second earphone and the terminal. When the first distance is greater than or equal to the first threshold value and the second distance is less than the second threshold value, the first earphone notifies the second earphone to establish a communication connection with the terminal, which does not require manual operations of a user, thereby improving communication connection efficiency.

In some implementations, the first distance is greater than the second distance.

In some implementations, the distance determining unit 601 configured to determine the first distance between the first earphone and the terminal and determine the second distance between the second earphone and the terminal is configured to: determine a first position of the first earphone and acquire a second position of the second earphone and a third position of the terminal; determine the first distance according to the first position and the third position, and determining the second distance according to the second position and the third position.

In some implementations, the distance determining unit 601 configured to determine the first distance between the first earphone and the terminal and determine the second distance between the second earphone and the terminal is configured to: determine a first received signal strength indicator (RSSI) value of a signal between the first earphone and the terminal, and determining the first distance according to the first RSSI value; acquire a second RSSI value of a signal between the second earphone and the terminal, and determining the second distance according to the second RSSI value.

In some implementations, the communicating unit 602 is further configured to: send to the terminal a request for disconnecting communication connection after sending to the second earphone the first message; receive a disconnection response in response to the request for disconnecting communication connection sent from the terminal; disconnect the communication connection between the first earphone and the terminal.

In some implementations, the apparatus further includes a first determining unit 603. The first determining unit 603 is configured to determine that an RSSI value of a signal between the terminal and the first earphone is less than or equal to a third threshold value before the communicating unit sends to the second earphone the first message.

In some implementations, the apparatus further includes a reminding unit 604. The reminding unit 604 is configured to generate a first voice reminder for reminding a user to shorten a distance between the first earphone and the terminal, when the first distance is greater than the second distance, the first distance is greater than or equal to the first threshold value, the second distance is greater than or equal to the second threshold value, and there are data to be transmitted from the terminal to the first earphone.

In some implementations, the apparatus further includes a second determining unit 605. The second determining unit 605 is configured to determine that the first earphone is in a wearing state before the reminding unit generates the first voice reminder.

In some implementations, the second determining unit 605 is further configured to determine whether the second earphone is in the wearing state when the first earphone is in a non-wearing state.

The apparatus further comprises an instructing unit 606. The instructing unit 606 is configured to instruct the second earphone to generate a second voice reminder for reminding the user to shorten the distance between the first earphone and the terminal when the second earphone is in the wearing state.

It should be noted that, the wearable device described herein are implemented as functional units. The term "unit" referred to herein should be understood as the broadest meaning as possible, and an object for implementing functions defined by each "unit" may be, for example, an application specific integrated circuit (ASIC), a single circuit, a processor (shared, dedicated, or chipset) and a memory for executing one or more software or firmware programs, a combinational logic circuit, and/or other suitable components that can achieve the above described functions.

The distance determining unit 601, the first determining unit 603, and the second determining unit 605, and the instructing unit 606 may be the control circuit or the processor. The communicating unit 602 may be the communication interface or the input-output circuit. The reminding unit 604 may be the audio assembly of the input-output circuit.

Implementations further provide a non-transitory computer storage medium. The computer storage medium is configured to store computer programs for electronic data interchange (EDI) which, when executed, are operable with a computer to perform some or all operations of any one of the foregoing method implementations. The computer includes a first earphone of wireless earphones.

Implementations further provide a computer program product. The computer program product includes a non-transitory computer-readable storage medium that stores computer programs. The computer programs are operable with a computer to execute some or all operations of any one of the foregoing method implementations. The computer program product may be a software installation package. The computer includes a first earphone of wireless earphones.

It is to be noted that, for the sake of simplicity, the foregoing method implementations are described as a series of action combinations, however, it will be appreciated by those skilled in the art that the present disclosure is not limited by the sequence of actions described. According to implementations, certain steps or operations may be performed in other order or simultaneously. Besides, it will be appreciated by those skilled in the art that the implementations described in the specification are exemplary implementations and the actions and modules involved are not necessarily essential to the present disclosure.

In the above implementations, description of each implementation has its own emphasis. For details not described in one implementation, reference can be made to related part in other implementations.

It will be appreciated that the apparatuses disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one. The integrated unit may take the form of hardware or a software functional unit.

If the integrated units are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc, to execute some or all operations of the methods described in various implementations. The above storage medium may include various kinds of media that can store program codes, such as a universal serial bus (USB) flash disk, a read only memory (ROM), a random access memory (RAM), a mobile hard drive, a magnetic disk, or an optical disk.

It will be understood by those of ordinary skill in the art that all or part of the various methods of the implementations described above may be accomplished by means of a program to instruct associated hardware. The program may be stored in a computer-readable memory, which may include a flash memory, a ROM, a RAM, a magnetic disk, an optical disk, and so on.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for establishing a communication connection, being applicable to a first earphone of wireless earphones, the wireless earphones further comprising a second earphone, the first earphone being in communication connection with a terminal, the first earphone being in communication connection with the second earphone, and the method comprising:
    determining a first distance between the first earphone and the terminal;
    determining a second distance between the second earphone and the terminal; and
    sending to the second earphone a first message for instructing the second earphone to establish a communication connection with the terminal, when the first distance is greater than or equal to a first threshold value and the second distance is less than a second threshold value;
    wherein before sending the first message to the second earphone, the method further comprises:
        determining that a received signal strength indicator (RSSI) value of a signal between the terminal and the first earphone is less than or equal to a third threshold value.

2. The method of claim 1, wherein the first distance is greater than the second distance.

3. The method of claim 1, wherein determining the first distance between the first earphone and the terminal and determining the second distance between the second earphone and the terminal comprises:
    determining a first position of the first earphone, and acquiring a second position of the second earphone and a third position of the terminal; and
    determining the first distance according to the first position and the third position, and determining the second distance according to the second position and the third position.

4. The method of claim 1, wherein determining the first distance between the first earphone and the terminal and determining the second distance between the second earphone and the terminal comprises:
    determining a first RSSI value of a signal between the first earphone and the terminal, and determining the first distance according to the first RSSI value; and
    acquiring a second RSSI value of a signal between the second earphone and the terminal, and determining the second distance according to the second RSSI value.

5. The method of claim 4, wherein acquiring the second RSSI value of the signal between the second earphone and the terminal comprises:
    acquiring the second RSSI value of the signal between the second earphone and the terminal from the second earphone, wherein the second RSSI value is determined by the second earphone when the second earphone receives a Bluetooth low energy (BLE) broadcast sent periodically from the terminal.

6. The method of claim 1, further comprising:
    after sending to the second earphone the first message,
        sending to the terminal a request for disconnecting communication connection;
        receiving a disconnection response in response to the request for disconnecting communication connection sent from the terminal; and
        disconnecting the communication connection between the first earphone and the terminal.

7. The method of claim 1, further comprising:
    generating a first voice reminder for reminding a user to shorten a distance between the first earphone and the terminal, when the first distance is greater than the second distance, the first distance is greater than or equal to the first threshold value, the second distance is greater than or equal to the second threshold value, and there are data to be transmitted from the terminal to the first earphone.

8. The method of claim 7, further comprising:
    before generating the first voice reminder,
        determining that the first earphone is in a wearing state.

9. The method of claim 8, further comprising:
    determining whether the second earphone is in the wearing state when the first earphone is in a non-wearing state; and
    instructing the second earphone to generate a second voice reminder for reminding the user to shorten the distance between the first earphone and the terminal, when the second earphone is in the wearing state.

10. An audio-output apparatus, being applicable to a first earphone of wireless earphones, the wireless earphones further comprising a second earphone, the first earphone being in communication connection with a terminal, the first earphone being in communication connection with the second earphone, and the apparatus comprising a processor, a memory, a communication interface, and one or more programs stored in the memory which, when executed by the processor, are operable with the processor to:

determine a first distance between the first earphone and the terminal;

determine a second distance between the second earphone and the terminal; and send to the second earphone a first message for instructing the second earphone to establish a communication connection with the terminal, when the first distance is greater than or equal to a first threshold value and the second distance is less than a second threshold value;

wherein the one or more programs stored in the memory, when executed by the processor, are further operable with the processor to:

determine that a received signal strength indicator (RSSI) value of a signal between the terminal and the first earphone is less than or equal to a third threshold value before the first message is sent to the second earphone.

11. The apparatus of claim 10, wherein the first distance is greater than the second distance.

12. The apparatus of claim 10, wherein the one or more programs operable with the processor to determine the first distance between the first earphone and the terminal and determine the second distance between the second earphone and the terminal are operable with the processor to:

determine a first RSSI value of a signal between the first earphone and the terminal, and determine the first distance according to the first RSSI value; and acquiring a second RSSI value of a signal between the second earphone and the terminal, and determine the second distance according to the second RSSI value.

13. The apparatus of claim 10, wherein the one or more programs are further operable with the processor to:

send to the terminal a request for disconnecting communication connection after sending to the second earphone the first message;

receive a disconnection response in response to the request for disconnecting communication connection sent from the terminal; and disconnect the communication connection between the first earphone and the terminal.

14. The apparatus of claim 10, wherein the one or more programs are further operable with the processor to:

generate a first voice reminder for reminding a user to shorten a distance between the first earphone and the terminal, when the first distance is greater than the second distance, the first distance is greater than or equal to the first threshold value, the second distance is greater than or equal to the second threshold value, and there are data to be transmitted from the terminal to the first earphone.

15. The apparatus of claim 14, wherein the one or more programs are further operable with the processor to:

determine that the first earphone is in a wearing state before generating the first voice reminder.

16. The apparatus of claim 15, wherein the one or more programs are further operable with the processor to:

determine whether the second earphone is in the wearing state when the first earphone is in a non-wearing state; and instruct the second earphone to generate a second voice reminder for reminding the user to shorten the distance between the first earphone and the terminal when the second earphone is in the wearing state.

17. A non-transitory computer-readable storage medium configured to store computer programs for electronic data interchange (EDI) which, when executed, are operable with a computer to:

determine a first distance between a first earphone of wireless earphones and a terminal, wherein the terminal is in communication connection with the first earphone and the first earphone is in communication connection with a second earphone of the wireless earphones;

determine a second distance between the second earphone and the terminal; and send to the second earphone a first message for instructing the second earphone to establish a communication connection with the terminal, when the first distance is greater than or equal to a first threshold value and the second distance is less than a second threshold value;

wherein the computer programs, when executed, are further operable with the computer to:

determine that a received signal strength indicator (RSSI) value of a signal between the terminal and the first earphone is less than or equal to a third threshold value before the first message is sent to the second earphone.

18. The non-transitory computer-readable storage medium of claim 17, wherein the computer programs operable with a computer to determine the first distance between the first earphone and the terminal and determine the second distance between the second earphone and the terminal are further operable with a computer to:

determine a first RSSI value of a signal between the first earphone and the terminal, and determining the first distance according to the first RSSI value; and acquire a second RSSI value of a signal between the second earphone and the terminal, and determining the second distance according to the second RSSI value.

\* \* \* \* \*